United States Patent [19]

Mier

[11] E Re. 30,175

[45] Reissued Dec. 25, 1979

[54] PLUMBERS TOOL

[75] Inventor: Mark F. Mier, Greenough, Mont.

[73] Assignee: Lawrence F. Irwin, Sylmar, Calif.

[21] Appl. No.: 818,985

[22] Filed: Jul. 25, 1977

Related U.S. Patent Documents

Reissue of:

[64] Patent No.: 3,609,788
Issued: Oct. 5, 1971
Appl. No.: 856,242
Filed: Aug. 11, 1969

[51] Int. Cl.[2] ..... B08B 9/02
[52] U.S. Cl. ..... 15/104.3 SN
[58] Field of Search ..... 15/104.3 SN

[56] References Cited

U.S. PATENT DOCUMENTS

| | | | |
|---|---|---|---|
| 2,167,268 | 7/1939 | Sanger | 15/104.3 SN |
| 2,237,880 | 4/1941 | Horst et al. | 15/104.3 SN |
| 2,284,939 | 6/1942 | Asnard | 15/104.3 SN |
| 2,297,775 | 10/1942 | Faust | 15/104.3 SN |
| 2,318,172 | 5/1943 | Long | 15/104.3 SN |
| 2,470,225 | 5/1949 | Silverman | 15/104.3 SN |
| 2,482,345 | 9/1949 | Kincaid | 15/104.3 SN |
| 2,504,391 | 4/1950 | Carson | 15/104.3 SN |
| 2,661,489 | 12/1953 | Rudolph et al. | 15/104.3 SN |
| 2,730,740 | 1/1956 | O'Brien | 15/104.3 SN |
| 2,769,191 | 11/1956 | Hunt | 15/104.3 SN |
| 2,828,133 | 3/1958 | Silverman | 15/104.3 SN |
| 3,162,878 | 12/1964 | Agostino | 15/104.3 SN |
| 3,246,354 | 4/1966 | Cooney et al. | 15/104.3 SN |
| 3,268,937 | 8/1966 | Bollinger | 15/104.3 SN |
| 3,298,051 | 1/1967 | Ratliff | 15/104.3 SN |
| 3,449,782 | 6/1969 | Hunt | 15/104.3 SN |

OTHER PUBLICATIONS

Plumbers' Pipe Cleaning Tools; Catalogue No. 51; General Wire Spring, 1949.
Spartan Electric Drain Cleaner Catalog; Model 700M.
O'Brien Manufacturing Corp. Catalog No. J.D. 63.
Spartan Tool Division; Conco; Bulletin 100-569; 1969.
Marco Products Co.; 1963 Catalog.

*Primary Examiner*—Edward L. Roberts
*Attorney, Agent, or Firm*—James E. Brunton

[57] ABSTRACT

The application discloses a basic container for a plumbers' flexible snake having a chuck through which the snake passes in and out, an adapter shell means suitable for mounting on a motor or on a crank which releasably attaches to the rear of the container to afford a means for rotating the container, and a container adaptable for mounting various forms of chucks.

9 Claims, 12 Drawing Figures

Fig. 5
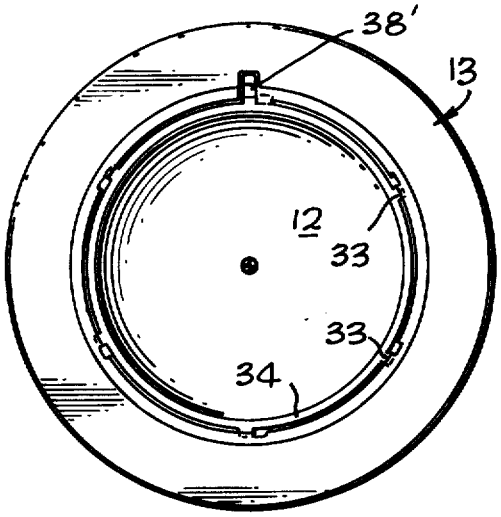
Fig. 6
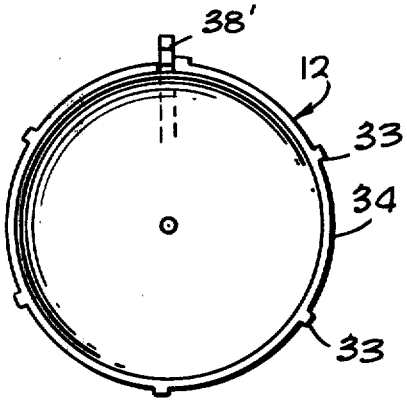
Fig. 7
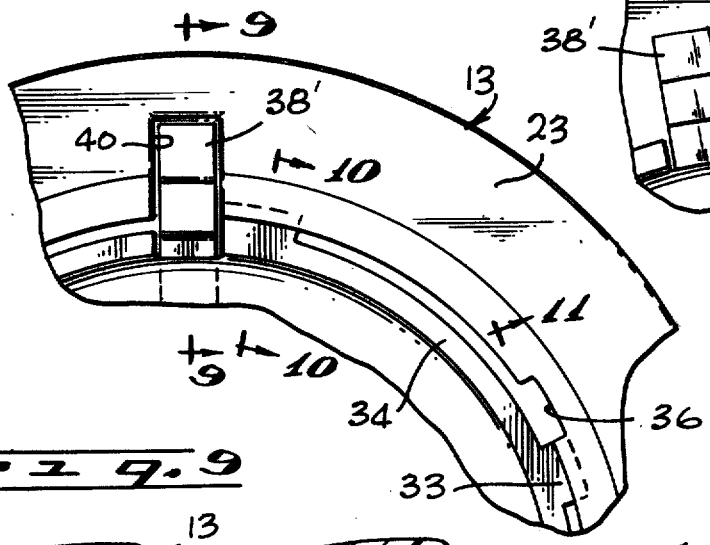
Fig. 8
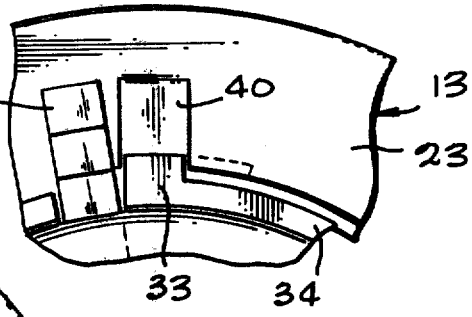
Fig. 11
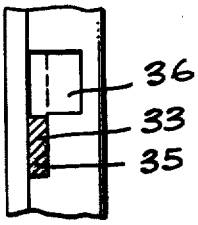
Fig. 9
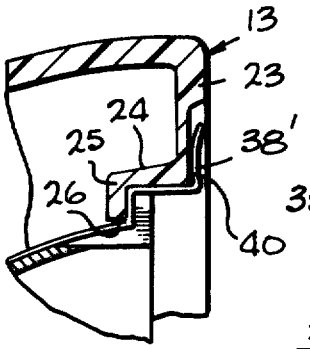
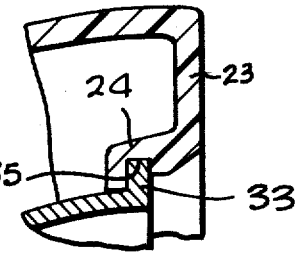
Fig. 10

PLUMBERS TOOL

Matter enclosed in heavy brackets [ ] appears in the original patent but forms no part of this reissue specification; matter printed in italics indicates the additions made by reissue.

The invention relates generally to plumbers' tools used in freeing stoppages in waste pipes and particularly to such hand-held tools as employ a flexible elongated member known as a plumbers' snake which is normally stored in the container portion of the tool to be fed therefrom as needed into the pipe and rotated either by hand or by means of a motor to reach and auger through any obstruction. The rotation of the snake is effected by rotating the container in which the snake is stored.

One of the most commonly used forms of snake consists of a helically coiled wire. Such snakes are manufactured in several diameters, two common sizes being 5/16" and ⅜" in diameter, as these two sizes enable the plumber to cope with stoppages in the various-sized waste pipes usually encountered where hand-held tools are used. While the container of a motorized tool will normally accommodate a spring of either size, many plumbers prefer to purchase two fully motorized units, one container loaded with the smaller spring and one with the larger spring, rather than be faced with the time-consuming and necessarily messy job of changing snakes for different-sized pipes as would be necessary if he had only one unit with two snakes. Consequently, the plumber must make a relatively large initial investment.

An object of the present invention is to provide a novel construction for a tool of the type under consideration which enables the plumber to quickly attach or detach the motor, or a hand crank, to any one of two or more containers which may house snakes of different diameters, thereby making it unnecessary for the plumber to have two completely motorized units and thus enabling the manufacturer and merchandiser to supply the plumber with his requirements at a substantial monetary saving without impairing his efficiency.

More particularly it is an object to provide a novel adapter and container, the adapter being mountable upon the motor or a hand crank and being detachably mountable on the container, which enables the plumber quickly to detachably connect the motor to any one of two or more containers or to attach a hand crank thereto. It is also an object to provide such an adapter that can be detachably mounted on a motor or a hand crank, thereby enabling the use of a single adapter, if desired.

A further object is to provide a container for a flexible snake which is so constructed that a variety of types of chucks can be mounted thereon interchangeably, thereby giving the purchaser a choice of chucks at the time of purchase as well as the option of changing to another style of chuck at a later date.

Another object is to provide means for making it convenient to inspect and perform maintenance of the coiled spring and interior of the container without removal of the coiled spring, by providing a detachable adapter that, when removed, provides open access to the interior of the container.

In summary, the invention provides a novel detachable mounting for a motor or hand crank designed to serve for detachably securing either to a storage container for a flexible snake, and a container adapted to receive the mounting and designed to be equipped with various styles of chucks through which the snake is fed.

These and other objects will be apparent from the drawings and the following description. Referring to the drawings:

FIG. 5 is a sectional view on line 5—5 of FIG. 2;

FIG. 6 is an elevational view of the outer side of the adapter shell;

FIG. 7 is a fragmentary view in the plane of FIG. 5 showing the interlocking means of the shell and adapter, but on a larger scale;

FIG. 8 is a fragmentary view similar to FIG. 7, but with the parts in a different position;

Figure 12:
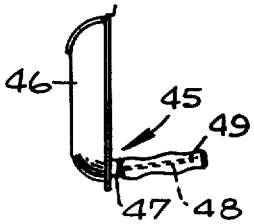

FIGS. 9, 10 and 11 are sectional views on lines 9—9, 10—10 and 11—11 of FIG. 7; and FIG. 12 is an elevational view of a combined adapter and hand crank.

More particularly describing the invention, it is a feature thereof that a construction is provided which enables a plumber to have the advantages of two fully motorized tools without incurring the full cost thereof. By way of example, in FIG. 1, a single motor unit 11 is shown together with adapter means 12 whereby the motor can be quickly detachably connected to a selected one of two or more plumbers' snake containers 13, of which two are illustrated, designed to house flexible snakes 14 of different diameters. Also shown in FIG. 1 is a hand crank 15, shown detachably fitted with adapter means 12 whereby it can be attached to any selected container 13 for use where electric power is not available.

Figure 1:
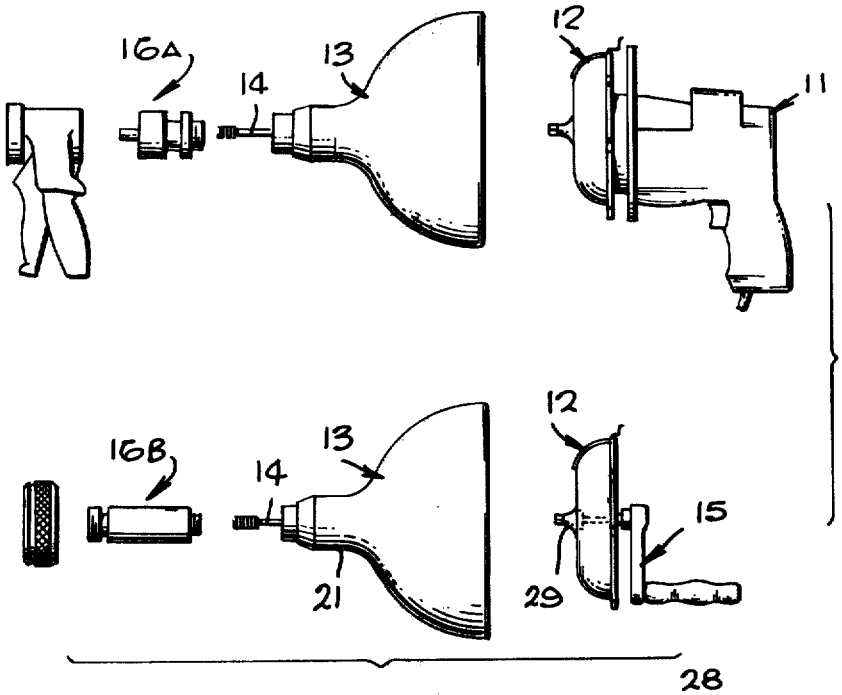
FIG. 1 is a view showing several basic tool units in elevation equipped with the invention.
Figure 2:
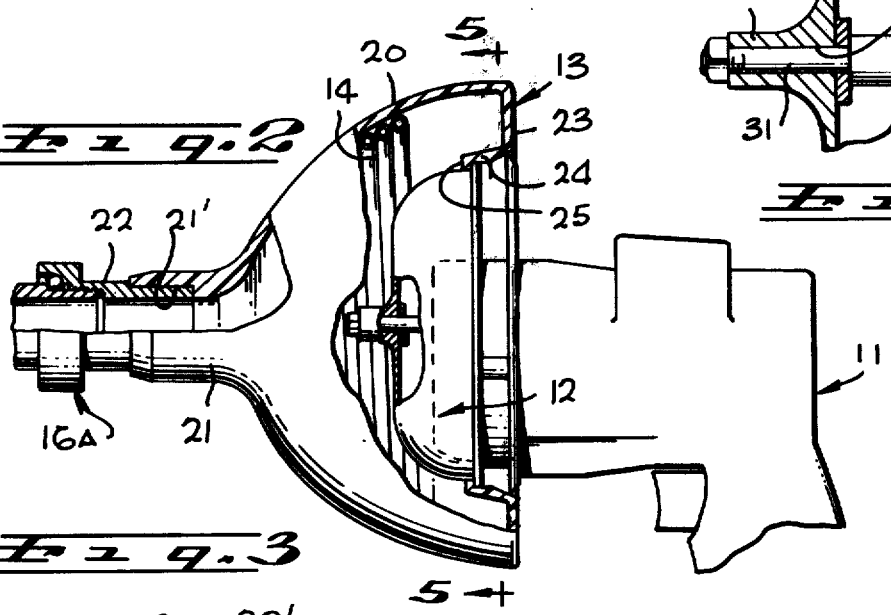
FIG. 2 is an elevational view, partly in section, of a motorized tool embodying the invention.

It is contemplated that the containers 13 are adaptable to have mounted thereon different styles of chucks and thus, in FIG. 1, the upper container 13 is shown provided with a chuck 16A of one type and the lower container 13 is shown provided with another type of chuck designated 16B.

The housing or container 13 comprises a case 20 in which the snake 14 is coiled for storage. The case is generally circular in cross section at any plane as shown and, referring to FIGS. 2–11, tapers from a large diameter at the rear to a reduced diameter axial neck 21 in which the chuck 16A is mounted and through which the snake extends and moves into and out of the container. A short metal tubular extension 22 is fixed in a counterbore 21' in the neck, and the chuck 16A is mounted in this, but it will be apparent that the chuck 16B, or another type of chuck, might be mounted therein. The rear wall of the container extends radially inward for a limited distance having a narrow annular section 23, an axially inwardly extending section 24, and an inwardly projecting flange 25 defining a relatively large opening 26.

Figure 4:
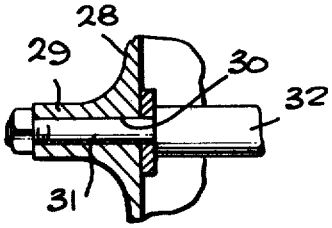
FIG. 4 is an enlarged sectional detail view of the end of the motor shaft and of the hub portion of the adapter shell.
Figure 3:
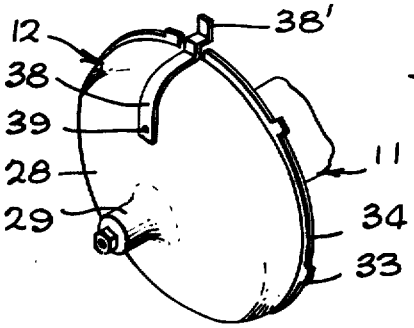
FIG. 3 is an isometric view of the adapter shell.

As previously indicated, either a motor or a hand crank is adapted to be attached to the container by an adapter 12. The latter comprises a generally circular shell 28 of concave-convex shape with a central forwardly projecting hub 29. The hub is provided with a bore 30 to accommodate the threaded end portion 31 of the shaft 32 of motor 11, as shown in FIG. 4, or to accommodate a similar end portion on a hand crank 15. Thus the adapter shell can be mounted on either the motor 11 or the hand crank 15, but, as a practical matter, it may be desirable to provide an adapter on each of these elements as shown for the convenience of the plumber.

The adapter shell is provided with a plurality of radial lugs 33 spaced circumferentially around a peripheral flange 34 which are receivable in circumferentially spaced slots 35 provided in the portion 24 of the wall of the container. These slots all extend in the same direction circumferentially with respect to a cutaway or open portion 36 which provides access of the lugs to the slots when the adapter shell is inserted axially into the container. Once in position it is turned clockwise relative to the shell, as the parts are viewed in FIGS. 7 and 8, to secure the two together. A latch is provided on the shell comprising a flat spring 38 mounted on the shell at its inner end at 39 and shaped to follow the general contour of the shell except at its free end portion 38' where it is stepped to fit the wall of the container and a locking recess 40 therein. This serves to lock the parts in assembled position, making it necessary to operate this latch by pulling the free end portion out of recess 40 in order to release the parts.

The tool when equipped with the motor or the hand crank operates in the customary way, that is, the rotation of the motor and its shaft serves to turn the container and hence the snake contained therein, the adapter shell 12 serving to transmit rotary motion of the motor shaft or shaft of the hand crank to the container. It will be apparent that the construction enables the achievement of the various objects pointed out above because of the ease with which the motor or hand crank can be detached from one container and attached to another.

It may be desirable to provide a combined adapter and hand crank, such as shown in FIG. 12 and designated 45. This comprises an adapter shell 46 which is generally similar to shell 28 except that it has no hub portion. The shell has a rearwardly facing, bored and internally threaded handle mounting boss 47. A pin 48 is mounted in this and supports a handle 49.

I claim:

1. In a plumbers' tool, a hollow container adapted to store a flexible plumbers' snake coiled therein and having an axially disposed neck at the front through which the snake extends and is movable, said container having an annular rear wall defining an opening, a motor having a shaft, an adapter shell mounted on the shaft of said motor, interengaging means on said shell and on said annular rear wall of said container for detachably securing said shell to said container *said interengaging means comprising a plurality of spaced apart slots provided in one of said shell and said annular rear wall and a plurality of spaced apart lugs provided on the other of said shell and said annular rear wall, said lugs being adapted to be receivable in said slots.*

2. The tool set forth in claim 1 in which said adapter shell is detachably mounted on the shaft of the motor.

3. The plumbers' tool set forth in claim 1 in which the interengaging means on said shell and said annular rear wall of the container comprises a plurality of circumferentially spaced lugs on said shell and a plurality of circumferentially spaced and circumferentially extending slots in the annular rear wall of the container receiving said lugs.

4. The tool set forth in claim 1 in which said shell extends forwardly a substantial distance into said container.

5. The tool set forth in claim 1 in which said container is provided with a chuck on the neck thereof through which the snake extends.

6. In a plumbers' tool:

(a) a hollow container adapted to store a flexible plumbers' snake coiled therein having an axially disposed neck at the front through which the snake extends and is movable and being formed at the rear with [an annular] wall means [extending radially inward and] *having a plurality of slots formed therein, said wall means* defining a relatively large opening whereby the container is open at the rear;

(b) an adapter shell detachably mounted on said [annular] wall means of said container in position to close the opening therein, *said adapter shell having interengaging means receivable in said slots whereby rotation of said adapter shell will cause rotation of said container*; and (c) means for rotating said shell, said means including a shaft, said shell being mounted on said shaft.

7. The tool set forth in claim 6 in which said adapter shell extends forward a substantial distance through said opening into said container.

8. In a plumbers' tool:

(a) a first means for housing a coiled flexible plumbers' snake;

(b) a second means in removable engagement with said first means for rotating said first means;

(c) means on one of said first or second means comprising a plurality of circumferentially spaced slots and means on the other of said first or second means comprising a plurality of circumferential lugs so constructed and arranged as to be receivable in said spaced slots; and (d) means for rotating said second means.

9. In a plumbers' tool:

(a) a first means for housing a coiled flexible plumbers' snake, *said first means comprising a hollow container including an annular shaped wall having circumferentially spaced apart interengaging means thereon;* and (b) a second means removably engaged to said first means for rotating said first means comprising:

(1) an adapter means for transmitting rotational movement to said first means;

(2) a locking means on said adapter means for cooperative engagement with said *interengaging means of said* first means for locking said first and second means in assembled position; and (3) a hand-held motor means removably engaged to said adapter means for rotating said adapter means relative to said motor means.

* * * * *